(12) United States Patent
Gordon

(10) Patent No.: US 6,296,796 B1
(45) Date of Patent: Oct. 2, 2001

(54) METHOD FOR MOLDING A TWO-MATERIAL PART USING A ROTATABLE MOLD INSERT MEMBER

(75) Inventor: Gary G. Gordon, Novi, MI (US)

(73) Assignee: TRW Inc.

( * ) Notice: Subject to any disclaimer, the term of this patent is extended or adjusted under 35 U.S.C. 154(b) by 0 days.

(21) Appl. No.: 09/243,038

(22) Filed: Feb. 2, 1999

(51) Int. Cl.[7] .............................. B29C 39/12; B29C 45/16
(52) U.S. Cl. ...................... 264/255; 264/328.7; 425/112; 425/129.1
(58) Field of Search .................................. 264/255, 310, 264/328.7; 425/112, 120

(56) References Cited

U.S. PATENT DOCUMENTS

| | | | |
|---|---|---|---|
| 5,472,655 | * | 12/1995 | Morita ................................... 264/245 |
| 5,753,151 | * | 5/1998 | McBride ................................ 264/1.9 |
| 5,788,995 | * | 8/1998 | Brams et al. .......................... 425/127 |
| 5,798,069 | * | 8/1998 | Bertschi et al. ...................... 264/255 |
| 5,922,264 | * | 7/1999 | Shimmell .............................. 264/255 |

* cited by examiner

Primary Examiner—Jan H. Silbaugh
Assistant Examiner—Edmund H. Lee
(74) Attorney, Agent, or Firm—Fay, Sharpe, Fagan, Minnich & McKee, LLP

(57) ABSTRACT

A mold insert member is provided to enable molding unitary composite parts from two materials so that the materials co-diffuse at their interface. The insert member is rotatable relative to a stationary molding die to define, in a first position, a first molding cavity for receiving a first molding material and, in a second position, a second molding cavity contiguous with the first molding cavity adapted to receive a first molding material. The insert member includes a substantially circular cylindrical main body portion defining a longitudinal axis. At least one arcuate mold lip is formed on an end of the main body portion and is adapted to cooperate with a molding die when the insert member is disposed in a first position relative to the molding die. At least one cavity area is formed on the end of the main body portion. The cavity area is adapted to define, together with the molding die, a second molding cavity when the insert member is rotated into a second position. The second molding cavity is adapted to receive a second molding material. The insert member is rotatable relative to a stationary molding die so that the first and second materials can be injected into the molding die without opening the die between injection shots.

8 Claims, 4 Drawing Sheets

METHOD FOR MOLDING A TWO-MATERIAL PART USING A ROTATABLE MOLD INSERT MEMBER

BACKGROUND OF THE INVENTION

The subject invention is directed to the art of molding parts and, more particularly, to a method and apparatus for molding parts from two or more materials in a two shot injection molding process.

Although the description of the invention below is facilitated in connection with the molding of a specialized nut used in automotive applications, the subject invention finds utility and is applicable in a wide range of part molding processes.

In order to meet the demands of certain specialized applications, it is often desirable to manufacture parts from two or more materials having different properties. As an example, it may be necessary to form a portion of the part from a first substantially rigid material such as nylon or polypropylene and to form a second portion of the part from a softer material such as, for example, a T.P.E. material. The nylon portion of the part is typically designed to withstand certain loading and stress conditions that the part is expected to experience during use. The softer area of the part formed from the T.P.E. or other similar material is typically designed to provide a seal between the part and another associated structure. Another reason to provide a softer area in the part is to produce a damping engagement surface that is able to withstand and dissipate vibrational energy between the part and one or more associated engagement elements. The softer material portion of the part is designed to dissipate the vibrational energy that might otherwise destroy or dislodge the part from the associated engagement member or cause damage to the part.

One traditional way to manufacture a composite part of the type described above from two or more materials is to use a technique known as two-shot injection molding. Typical two-shot molding apparatus include a set of die members that cooperatively form a closed cavity. In a first position, the die members form a first cavity that defines a first portion of the part. The cavity is filled with a first moldable material during a first injection shot. Thereafter, at least one of the die members forming the first cavity in the injection molding apparatus is moved linearly from a first position closed on the part to a second position spaced from the part. The separation between the part and the translated die member creates a second cavity adapted to receive a second moldable material during a second injection shot. Multiple linear mold motions could be used with multiple materials to create composite parts.

One limitation of this type of molding process is that the second cavity created by the relative linear motion between the respective die members is necessarily uniform in cross-section along the axis of the linear motion between the die cavities. That is, the second cavity created by the gap between the movable die member and the part held in place by the non-moving die members necessarily takes on the profile of an extruded part.

Not all parts, however, are designed to resemble an extruded shape in the volume occupied by the second molding material. This poses a serious limitation on the use of two-shot injection molding apparatus that linearly translate one or more die members between shots.

Another form of two-shot injection molding includes a tool or die member that is adapted to open the mold and rotate from a first position to a second position between injection shots. In that type of apparatus, one or more of the mold die members are provided with secondary cavities that are used overmold the secondary material onto the primary material previously formed in the first injection shot and held in place by the non-moving die members. Processes that open the mold between periods of filling the mold with different materials have been fairly successful in producing a reasonable range of parts.

One important constraint, however, in all two-shot injection molding processes is the time delay between injection shots. The pause between mold fill periods must be as short as possible to ensure good bonding between the first and second molding materials. Overall, the longer the time delay between injection shots, the more likely it is that the resultant part will exhibit poor adhesion properties at the interface between the first and second moldable materials. Preferably, the second material should be introduced into the second molding cavity substantially immediately after the first material fills the first cavity so that the first and second materials have an opportunity to co-diffuse at their respective interface surfaces. Further, the second material should be introduced into the mold before the first material has had an opportunity to substantially cool and shrink.

In two-shot injection molding apparatus that are constrained to open the mold cavity before initiating relative movement between one or more die members to create the second cavity, the time required to execute the mechanical motion of the tool can prohibit the co-diffusion action. Most often, without the use of artificial heater elements or the like in the tool, the first material usually cools excessively in the first mold cavity during manipulation of the respective die members. The result is an inadequate bonding between the first and second materials compromising the integrity of the part.

It has, therefore, been considered desirable to develop a new and improved method and apparatus for molding composite parts from diverse constituent materials into a unitary integrated form. It is further desirable to provide a molding method and apparatus capable of producing parts that have surfaces and shapes that are more complicated than parts having simple extrusion-type cross-sections.

SUMMARY OF THE INVENTION

The subject invention provides a rotatable mold insert member and method of molding a two-material part using the rotatable mold insert member in a molding apparatus. The method and apparatus of the present invention overcomes the above-noted problems and results in the formation of unitary parts molded from two or more different molding materials that exhibit good bonding characteristics between the different molding materials. For all practical purposes, the resultant parts are unitary because the present invention enables co-diffusion between the first and second molding materials at their respective interfaces.

In particular, and in accordance with one aspect of the invention, an insert member is provided for use with a molding die to mold a unitary composite part from first and second materials. The insert member includes a substantially circular cylindrical main body portion defining a longitudinal axis. At least one arcuate mold lip is formed on an end of the main body portion. The mold lip is adapted to cooperate with the molding die when the insert member is disposed in a first position relative to the molding die to define, together with the molding die, a first molding cavity adapted to receive a first molding material. At least one cavity area is also formed on the end of the main body portion. The cavity area is adapted to cooperate with the molding die when the insert member is rotated about the longitudinal axis into a second position relative to the molding die. In the second position, the cavity area and molding die cooperatively define a second molding cavity contiguous with the first molding cavity for receiving second molding material.

In accordance with a more limited aspect of the invention, a pair of arcuate mold lips are formed on the end of the main body portion. In addition, a pair of cavity areas are also formed on the end of the main body portion. The pair of cavity areas define, together with the molding die, a pair of second molding cavities when the insert member is rotated into the second position relative to the molding die. The pair of second molding die cavities are adapted to receive the second molding material.

By molding the second material directly onto the first material without opening the molding die, the problems associated with adhesion between the first and second materials are overcome. The first and second materials in the resultant part become what is in effect a one-piece unitary structure with the second material integrally formed with the first material in a well bonded fashion.

In accordance with a still further aspect of the invention, a method of molding a part from at least two moldable materials is provided. First, a mold is provided having a first cavity defining a first volume of the part. The first cavity is filled with a first moldable material. Without opening the mold, a portion of the mold is rotated to form a second cavity defining a second volume of the part. The second cavity is filled with a second moldable material and, thereafter, the mold is opened to release the part.

In accordance with a more limited aspect of the invention, the second cavity of the mold is filled with the second moldable material before the first moldable material cools and shrinks a substantial amount so that the second moldable material bonds to the first moldable material.

In accordance with yet another aspect of the invention, the second cavity of the mold is filled with the second moldable material within a time period to enable the first and second materials to co-diffuse at their respective interface surfaces.

As can be seen from the foregoing, a primary object of the invention is the provision of composite parts and a method of forming same which results in what is effectively a unitary composite part that does not require separate assembly or bonding of a second material portion of the part onto a first material portion of the part.

A further object of the invention is the provision of an apparatus and method of forming the same wherein the second material is injected into a molding cavity after the first material is molded but without opening the molding cavity.

A further object of the invention is the provision of a rotatable insert member adapted for use in a molding die to mold unitary composite parts from first and second materials. Preferably, the insert member is rotatable in both clockwise and counterclockwise directions without experiencing impinging interference with any of the mold members of the stationary molding die.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, and in certain steps and arrangement of steps, the preferred embodiment of which will be described in detail in this specification and illustrated in the accompanying drawings which form a part hereof, and wherein.

DETAILED DESCRIPTION OF THE PREFERRED EMBODIMENT

Figure 1:
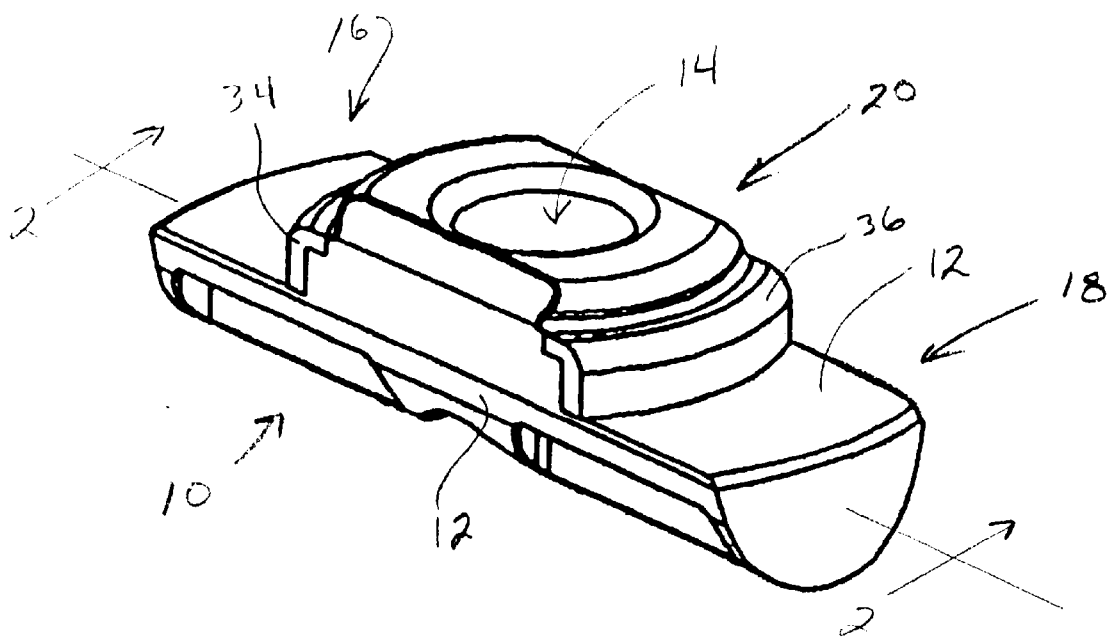
FIG. 1 is an isometric view showing a composite part formed from two materials in accordance with the preferred embodiment of the invention.
Figure 2:
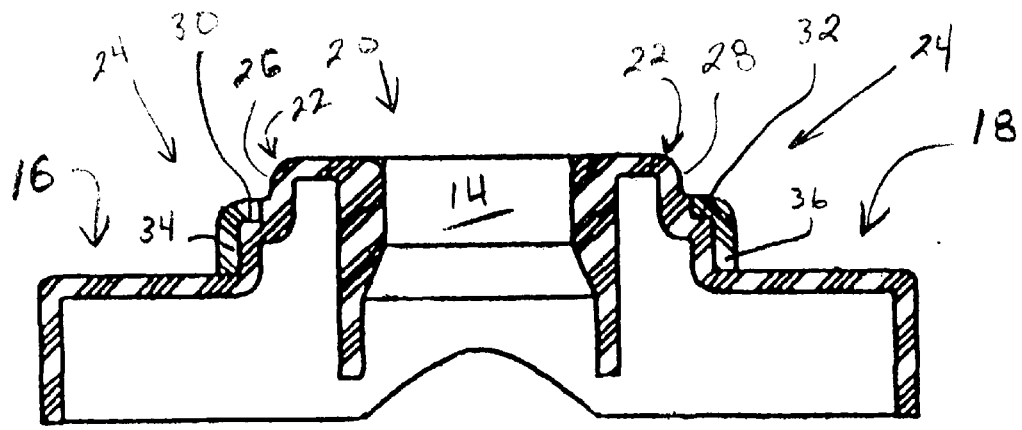
FIG. 2 is a cross-sectional view taken on line 2—2 of FIG. 1.

Referring now to the drawings wherein the showings are for the purposes of illustrating the preferred embodiment of the invention only and not for purposes of limiting same, FIGS. 1 and 2 illustrate an exemplary composite part 10 formed from two materials in accordance with the present invention. The part shown is a specialized nut used in the automotive industry to fasten a spare tire to a support member within the vehicle body. The nut includes a main body 12 with a central bore 14 extending therethrough. The bore is preferably internally threaded so that the nut can be spun onto an associated elongate lug member fastened on one end to the vehicle. A pair of ears 16, 18 extend outwardly from a central engagement region 20. The ears 16, 18 help facilitate tightening the subject automotive nut onto the associated threaded stud without the use of tools so that tire changes are easier for the vehicle operators.

As shown best in FIGS. 1 and 2, the engagement region 20 of the part is formed in the shape of a truncated cylinder. A first and second set of shoulder areas 22, 24 are preferably sized and arranged to form a step-like profile on the engagement region as shown. The first shoulder area 22 includes a pair of outer wall surface 26, 28 that are adapted to extend through the inner circular hub of a spare tire during use of the subject automotive nut. The outer wall surfaces substantially trace a cylindrical outline as the nut is threaded onto the associated support stud. The second shoulder area 24 includes a pair of upper semi-circular deck surfaces 30, 32 as shown. The deck surfaces are arranged on the engagement region to extend radially outwardly from the pair of outer wall surfaces.

Of particular relevance to the invention at hand, the exemplary automotive nut carries a set of semi-circular engagement tabs 34, 36 disposed on opposite sides of the central bore 14 as illustrated. The set of engagement tabs interface the deck surfaces 30, 32 of the automotive nut to the associated spare tire. Preferably, the engagement tabs are formed of a soft material to absorb vibrational energy between the automotive nut and the associated spare tire when the two are connected to an automotive body. During use of the subject automotive nut, the engagement tabs 34, 36 contact the spare tire rim while the wall surfaces 26, 28 extend through the hub hole of the rim.

Figure 3:
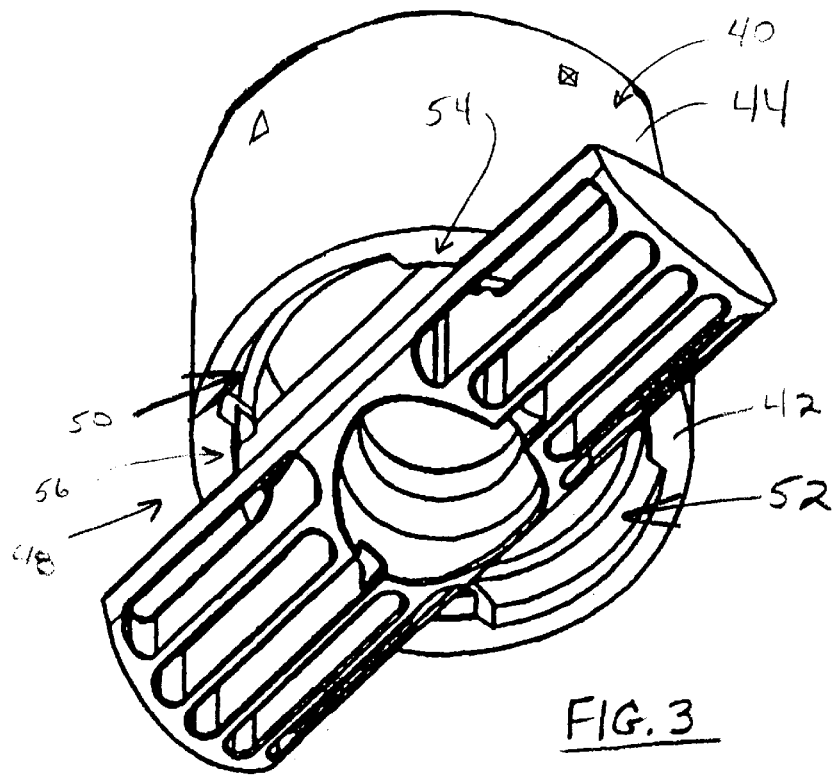
FIG. 3 is a bottom isometric view of a rotatable mold insert member oriented in a first position relative to the part during a first injection shot.
Figure 6:
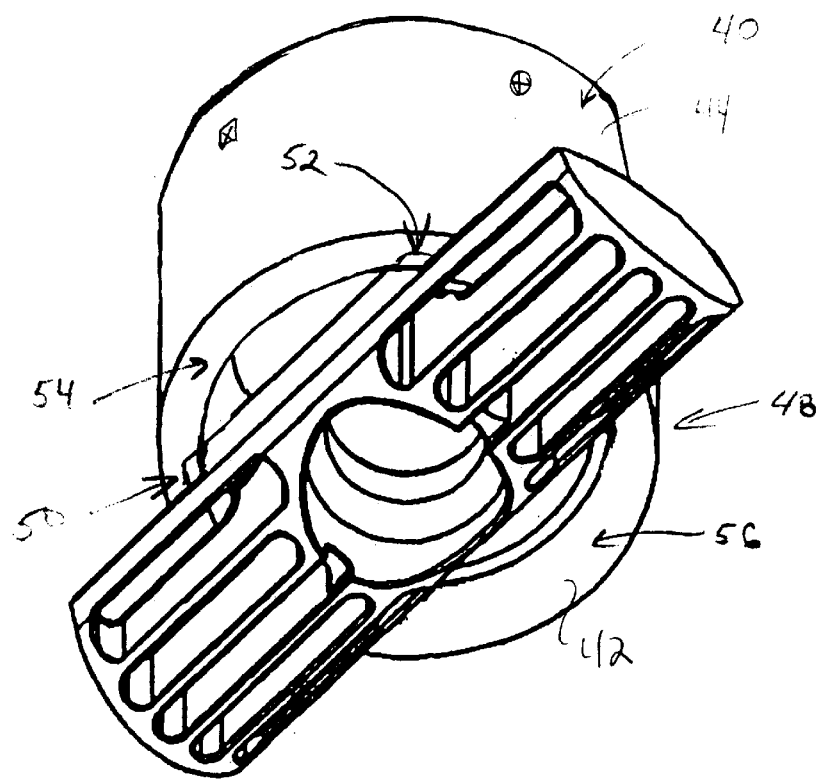
FIG. 6 is a bottom isometric view of the rotatable mold insert member oriented in a second position relative to the part during a second injection shot.
Figure 4:
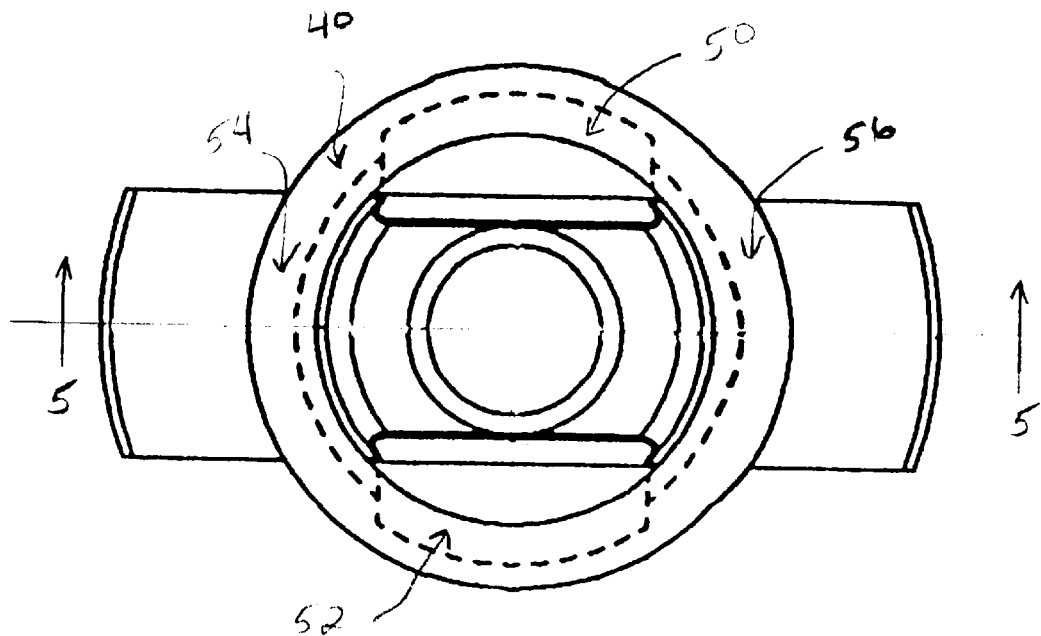
FIG. 4 is a top plan view of the part and rotatable mold insert member in the positions shown in FIG. 3.
Figure 5:
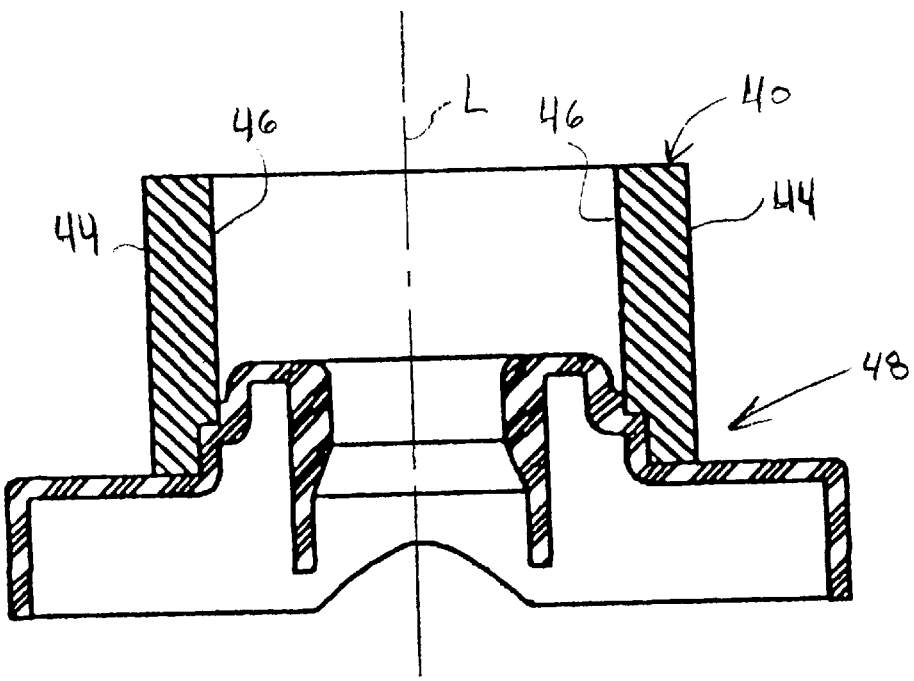
FIG. 5 is a cross-sectional view of the insert member and part taken along line 5—5 of FIG. 4.
Figure 7:
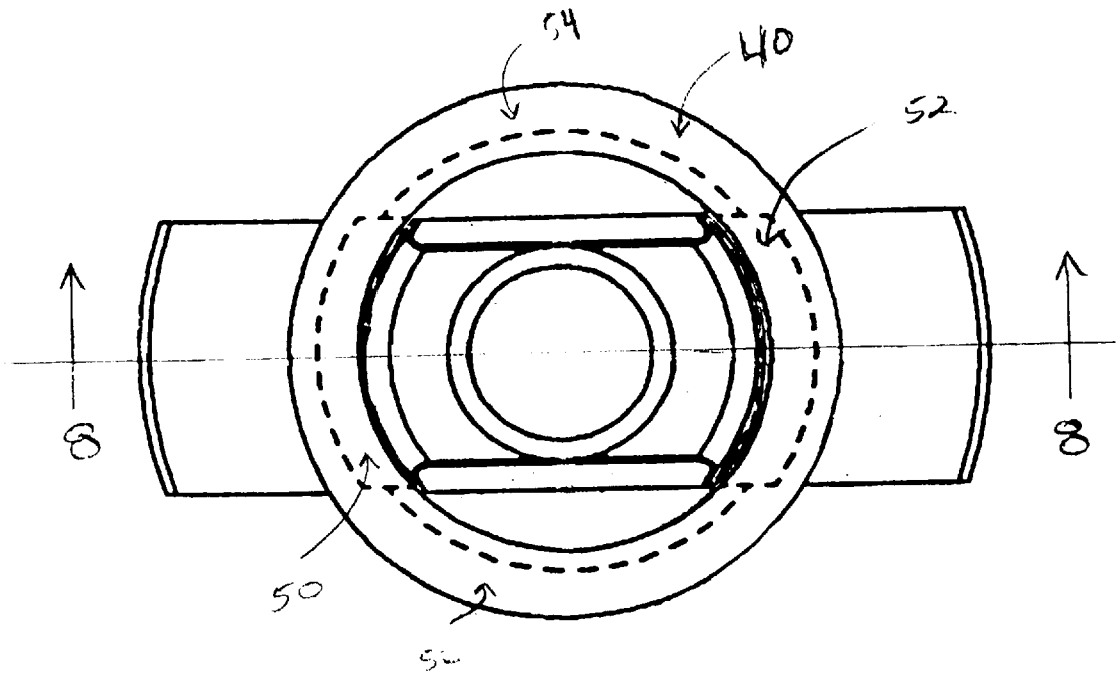
FIG. 7 is a top plan view of the part and rotatable mold insert member in the position shown in FIG. 6; and, FIG. 8 is a cross-sectional view of the insert member and part taken along line 8—8 of FIG. 7.
Figure 8:
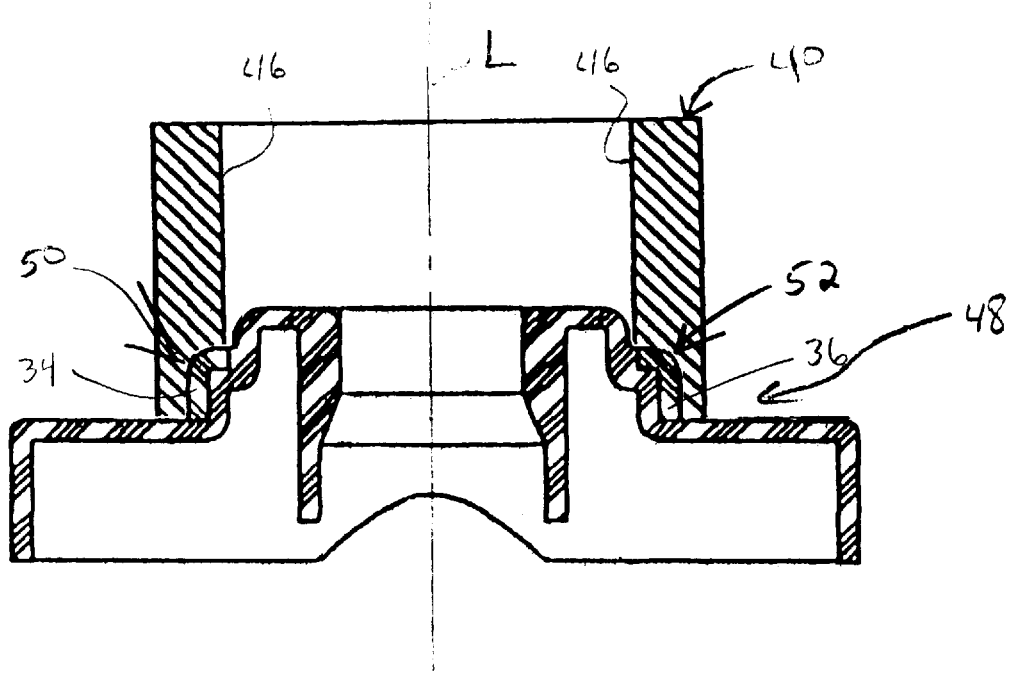

The set of engagement tabs 34, 36 are formed in accordance with the present invention using a rotatable mold insert member 40 in conjunction with an otherwise standard two-shot injection molding apparatus. FIGS. 3–5 illustrate the mold insert member 40 disposed in a first position for formation of the main body 12 of the automotive nut during a first injection shot. FIGS. 6–8 illustrate the mold insert member 40 rotated into a second position during the second injection shot for overmolding the engagement tabs 34, 36 onto the automotive nut body 12.

Turning first to FIGS. 3–5, the main body 12 of the automotive nut is formed of a first material injected into a mold cavity (not shown) during the first shot of a two-shot injection molding process. Preferably, the first moldable material is nylon or polypropylene. For the sake of clarity in the drawing figures, only the rotatable mold insert member 40 is illustrated to show the relative orientation between the part and the insert member during the first and second injection shots. The other mold members forming the basic automotive nut cavity are not shown because they are well known to those skilled in the art.

The rotatable mold insert member is substantially circular cylindrical in shape and includes a flat circular bottom surface 42 and smooth outer and inner cylindrical walls 44, 46. The bottom end 48 of the insert member 40 includes a pair of cavity areas 50, 52 formed in the inner cylindrical wall 46 as shown on opposite sides of the major axis L of the insert member 40. A pair of arcuate mold lips 54, 56 are disposed on the bottom end 48 of the insert member 40 between the cavity areas 50, 52. As illustrated in FIGS. 3–5, the mold lips 54, 56 are used during the first injection shot to form the lower shoulder area 24 of the part including the first and second deck surfaces 30, 32. During this time, the pair of cavity areas 50, 52 are positioned 90° away from the area of the molding members used to form the main body of the automotive nut. As such, the cavities are not used at all in the formation of the part during the first molding shot.

During the second injection shot, the rotatable mold insert member 40 is disposed in the orientation illustrated in FIGS. 6–8. To reach the position shown in those figures, the insert member is rotated one quarter turn between the first (FIG. 3) and second (FIG. 6) injection shots. In the second position shown in FIGS. 6–8, the cavity areas 50, 52 are disposed adjacent the axially extending pair of ears 16, 18 to form a pair of second mold cavities into which a second material is injected. The second moldable material is preferably softer than the first moldable material used to form the main body of the automotive nut. In the preferred embodiment of the invention, the second molding material is a T.P.E. material. The T.P.E. material is overmolded onto the second shoulder area 24 during the second injection shot to form the pair of engagement tabs 34, 36.

The cylindrical symmetry of the rotatable mold insert member permits the secondary mold cavities to be formed without opening the main mold cavity between injection shots. In accordance with the invention, the time delay between the first and second injection shots is about two (2) seconds. This short time period permits the first and second moldable materials to co-diffuse at their interface surfaces. The result is a unitary composite part with good adhesion properties between the first and second materials. For other materials different inter shot delays may be used as appropriate to enable co-diffusion between the materials. The rotatable insert molding of the present invention allows the selection of a wide range of very short inter-injection cycle delay periods.

As shown best in FIGS. 3, 4, 6, and 7, the mold insert member is readily movable through a one quarter turn rotation between the first and second injection shots in both the clockwise and counterclockwise directions without experiencing impinging interference with any of the main mold members. The bottom surface 42 of the bottom end 48 of the mold insert member is flat to permit free rotation of the insert member when the mold is closed.

In the embodiment described above, the cavity areas 50, 52 formed in the bottom end of the insert member are symmetric and substantially identically formed. However, other size and profiles of cavity areas could be used to form parts that lack such symmetry and require more exotic shapes. For those parts, each of the cavity areas 50, 52 are formed to independently define the shape of its respective overmold portion of the part. In addition, by merely increasing the thickness of the mold insert member between the inner and outer cylindrical walls, larger cavity areas are enabled thereby further increasing the range of composite parts that can be formed in accordance with the present invention. Also, the rotatable mold insert member could be provided with a plurality of cavities, and further, with staggered cavities whereby a plurality of secondary materials could be used and multiple materials could be overmolded atop one another to build up areas of the part with multiple materials.

The invention has been described with reference to the preferred embodiment. Obviously, modifications and alterations will occur to others upon a reading and understanding of this specification. As an example, although the rotatable insert member was described as having an overall circular cylindrical shape, other shapes can be used as well, such as, for example, hemispherical and semi-spherical shapes or any other shapes that permit the insert member to be rotated between injection shots without opening the mold. It is intended to include all such modifications and alterations insofar as they come within the scope of the appended claims or the equivalents thereof.

Having thus described the invention, it is claimed:

1. A method of molding a part from at least two moldable materials, the method comprising the steps of:

providing a mold having main mold members and a mold insert member forming a first cavity defining a first volume of the part;

filling the first cavity of the mold with a first moldable material;

without moving the insert member to avoid an impinging interference between i) the main mold members and the mold insert member, and ii) the first moldable material and the mold insert member, and without opening said mold, rotating the insert member relative to the main mold members to form a second cavity defining a second volume of the part, wherein the second cavity is disposed adjacent the first moldable material;

filling the second cavity of the mold with a second moldable material such that it contacts the first moldable material; and, opening the mold to release the part.

2. The method according to claim 1 wherein the step of providing the mold insert member includes providing a mold insert member having cylindrical symmetry.

3. The method according to claim 1 wherein the step of filling the second cavity of the mold with the second moldable material includes filling the second cavity of the mold with the second moldable material before said first moldable material cools and shrinks a substantial amount so that the second moldable material bonds to the first moldable material.

4. The method according to claim 3 wherein:

the step of filling the first cavity of the mold with the first moldable material includes injecting the first moldable material into said first cavity; and the step of filling the second cavity of the mold with the second moldable material includes injecting the second material into the second cavity.

5. The method according to claim 1 wherein the step of rotating said insert member includes rotating the insert member substantially one quarter turn.

6. The method according to claim 1 wherein the step of filling the second cavity of the mold with the second moldable material includes filling the second cavity of the mold with the second moldable material within a time period to enable the first and second materials to co-diffuse at their respective interface surfaces.

7. The method according to claim 1 wherein:

the step of providing said mold includes providing a mold having i) a first cavity defined in part by cooperative main mold portions and a first surface of said mold insert member selectively rotatable to a first position relative to the cooperative mold portions and ii) a second cavity defined in part by said cooperative mold portions and a second surface of said mold insert member selectively rotatable into a second position relative to the cooperative mold portions;

the step of filling the first cavity of the mold with the first moldable material includes positioning said mold insert member into said first position;

the step of filling the second mold cavity with said second moldable material includes positioning said mold insert member into said second position; and, the step of rotatably moving a portion of the mold to form said second cavity includes rotating said insert member 90°.

8. The method according to claim 7 wherein:

the step of filling the first cavity of the mold with said first moldable material includes injecting a one of a polypropylene material and a nylon material into said first cavity; and, the step of filling the second cavity of the mold with said second moldable material includes injecting thermoplastic elastomer material into said second mold cavity.

* * * * *